Figure 1:
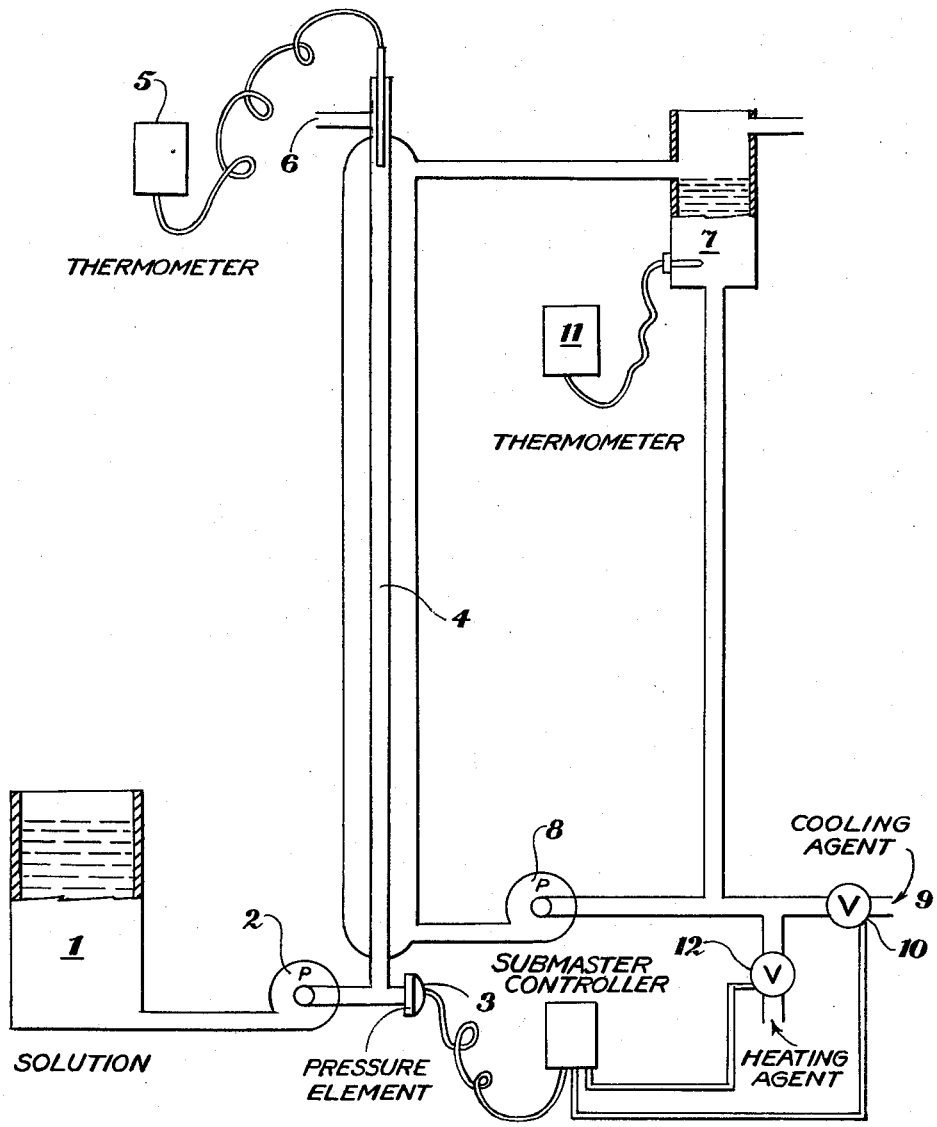

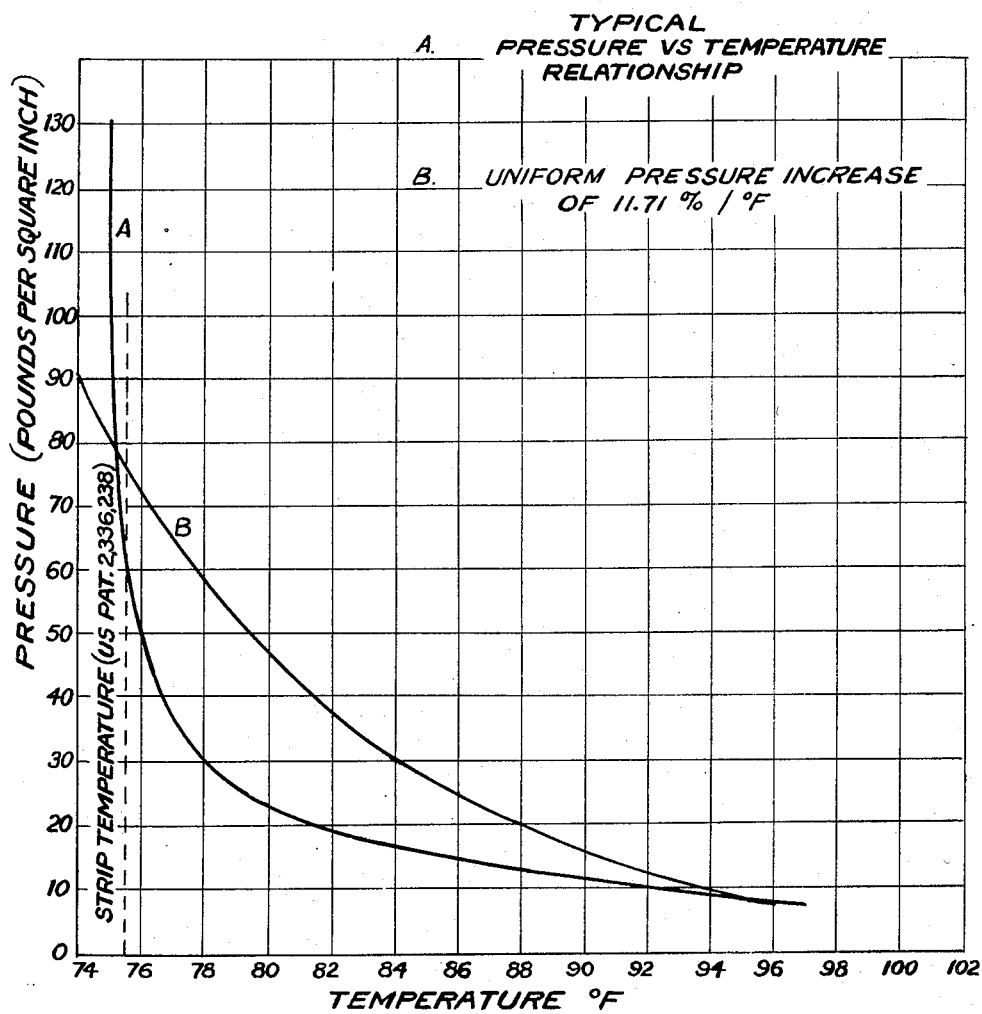

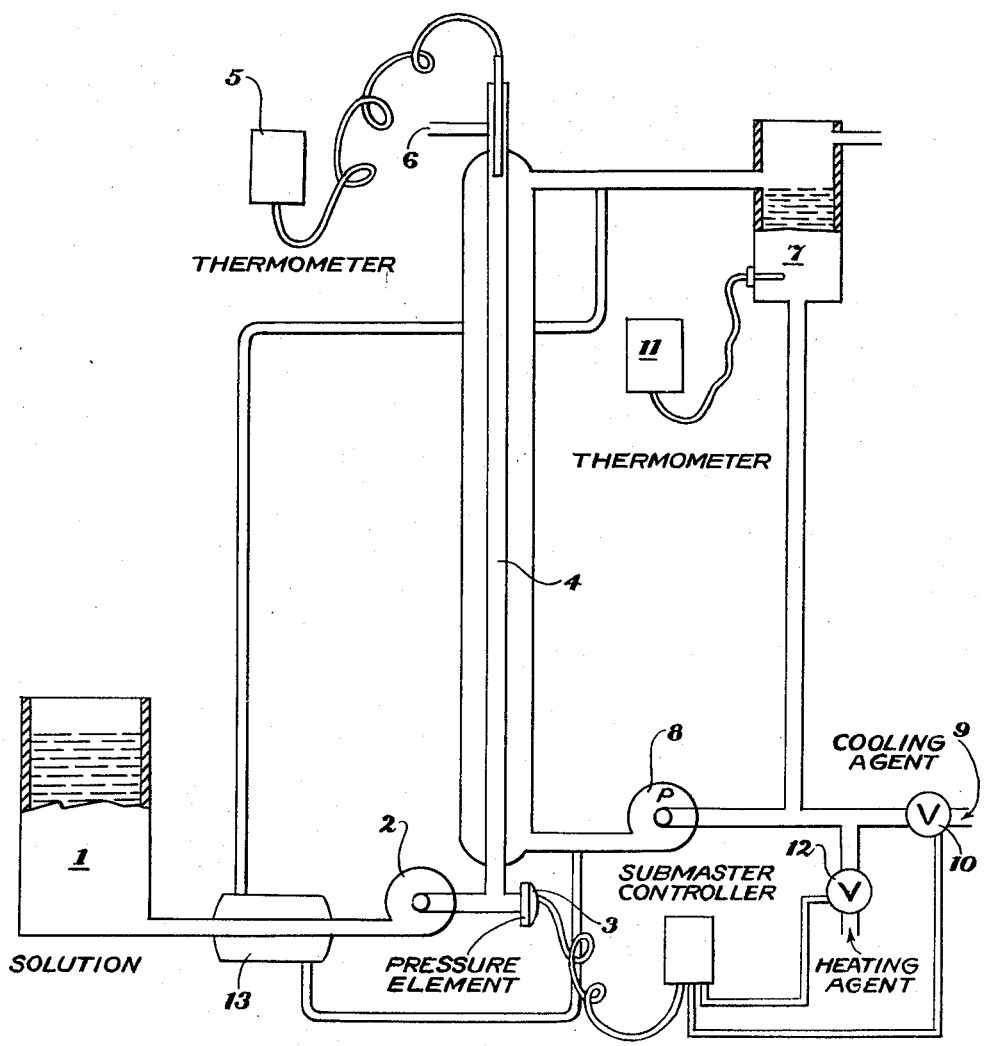

2,952,152
GEL-POINT INDICATOR

Webster E. Fisher and Francis E. Fox, Jr., Rochester, N.Y., assignors to Eastman Kodak Company, Rochester, N.Y., a corporation of New Jersey Filed Feb. 21, 1955, Ser. No. 489,574
5 Claims. (Cl. 73—17)

This invention concerns a continuous, rapid, and automatic method and apparatus for measuring the gel points of cellulose derivatives solutions which undergo gelation upon cooling. It is customary in making transparent films and lacquer coatings to dissolve various cellulose organic acid esters in suitable solvents to provide mixtures which are liquid above a temperature of about 50° C. and would set to supporting gels as the temperature is lowered to a point within the range of 10° to 50° C. The specific temperatures involved depend, of course, on the particular constituents used in the cellulose ester dope or lacquer. However, in order to secure the best results, it is necessary or desirable to know the temperature to which the particular dope or lacquer will gel so that the cooling mechanism can be properly controlled so that the gel temperature can be corrected or adjusted to meet usage requirements. Such cellulose ester solutions as may be used for this purpose are fully described in the patents to Fordyce and Clark Nos. 2,350,742, 2,350,743, and 2,350,744 to which reference may be made. Various cellulose derivatives may be operative in these dopes such as cellulose acetate propionate, cellulose acetate butyrate and the like in a solvent mixture consisting of propylene chloride and ethylene chloride, or propylene chloride and a lower aliphatic alcohol such as methyl alcohol.

Various methods have been determined for measuring the gel point of these dopes or lacquers which are useful in batch production. For instance a standard method of measuring this property is to spread a strip of cellulose ester solution on a metal bar, along which a known temperature gradient is maintained. After being left for a standard length of time, the strip is lifted and the bar temperature corresponding to the point at which the solution pulls apart is determined as the strip temperature. Apparatus for this method is disclosed in U.S. Patent 2,336,238, issued to Fordyce and Vivian. However, this method is not adaptable to continuous processes. Moreover, frequent samples would require a large amount of labor and there would be a significant delay in obtaining the results.

In order to make cellulose ester solutions continuously, it is necessary to have a rapid, automatic and preferably continuous method for obtaining a gel point temperature. Our invention provides such a method.

An object of this invention is to provide a method of rapidly, automatically and continuously obtaining the gelation temperature of a liquid solution capable of gelling at a given temperature or within a given temperature range. Another object is to provide an apparatus for continuously carrying out the method of measuring the gel point.

The above objects are obtained by passing the fluid by means of a pump, through a tube in which a fluid is cooled to a temperature approaching the gel point. A criterion of such a condition is the operation of the equipment at extremely high pressure, indicative of the high viscosity occurring at the steeply ascending position of the temperature—viscosity curve.

In making up a gelable solution, the proportions of the components are adjusted to provide a solution which will gel at a temperature within the operating range of the casting wheel on which the material is to be cast. The components of the dope are added to a continuous mixer at the top with a takeoff near the bottom through which a small amount of solution passes continuously to the gel point indicator where readings are taken to indicate any changes in the proportions which may be needed to maintain a given gel point.

As a solution passes through the gel point indicator it is pumped through a conduit and gradually cooled until it reaches the gel point at which point the viscosity increases suddenly. This is measured as pressure as illustrated in Figure 3 due to the action of the pump which propels the dope through the gel point indicator.

Prior to reaching the gel point, the pressure of a typical dope increases slowly about 1 lb. per square inch per degree Fahrenheit of cooling. This temperature at which the pressure increases at a constant rate is the temperature and pressure referred to herein as the temperature sufficiently above the gelation temperature to be uninfluenced by the gelling of the liquid. Since the desired gel point is known, the temperature-pressure relationship for a given dope is also predetermined.

As the dope is cooled further, the pressure increases until as the gel point is approached the pressure begins to increase more rapidly. At the gel point the pressure increases abruptly.

In Figure 3 the pressure of a typical gel with a gel point of 75.5 increased at about 4 lbs. per square inch per degree. At the gel point the pressure was increasing about 30 lbs. per square inch or at a rate of at least 7 times.

Curve B, Figure 3, shows a uniform pressure increase of a solution which does not gel but whose viscosity would uniformly increase as the solution were cooled.

Figure 2:
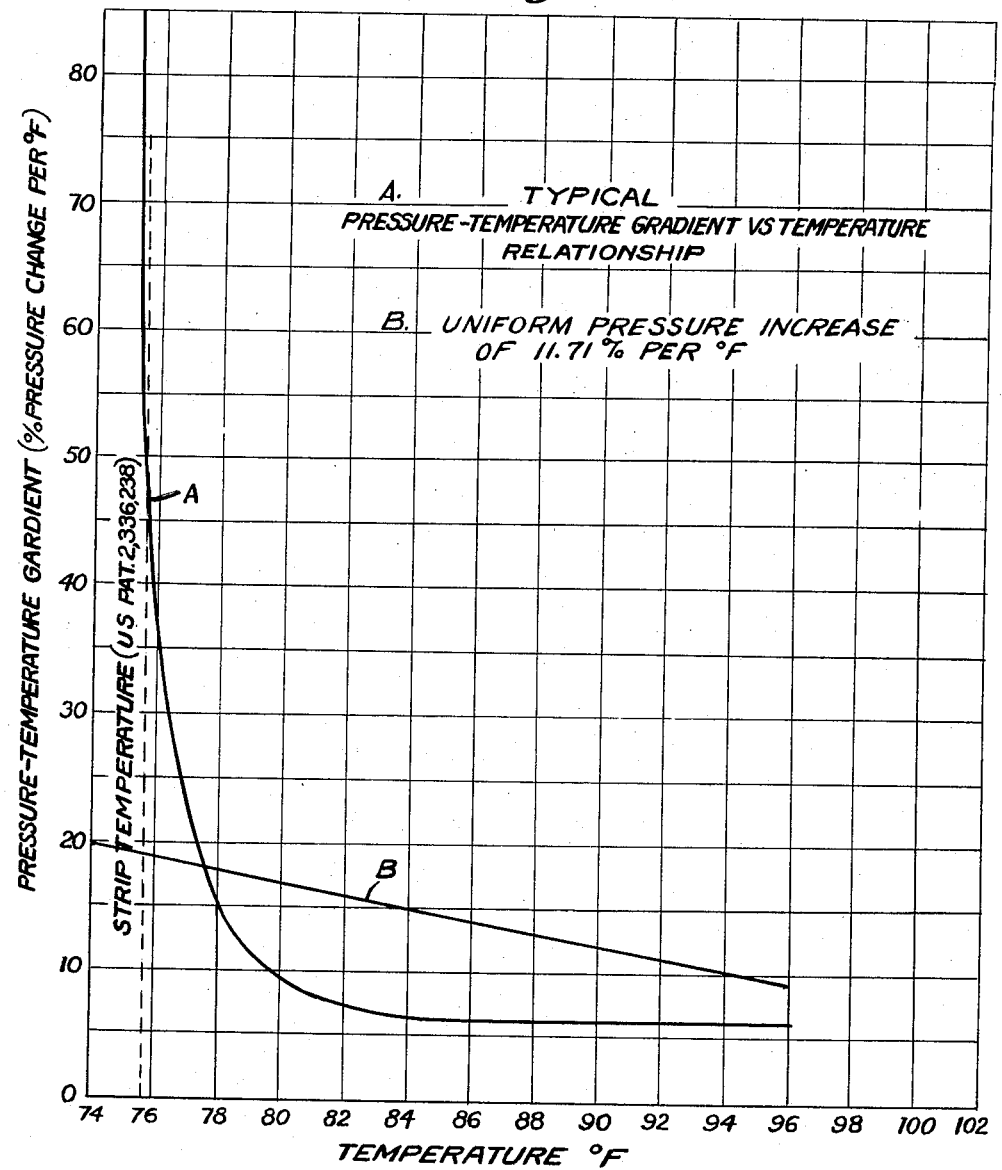

Figure 2 shows the data of Figure 3 in terms of percent temperature change per degree Fahrenheit and from 76° to 75° Fahrenheit the percent increase was about 50% for a typical dope. The comparison, curve B, Figure 2, is a straight line showing what would happen if a non-gelling liquid were cooled over the same range of temperatures. The gel point of the typical dope is at the point where there is a significant pressure increase.

Fig. 1 illustrates one embodiment of our invention. The solution whose gel point is to be measured is in a container 1 which may represent a continuous mixer, batch mixer or other vessel. The solution is conveyed by means of a pump 2 past a pressure element 3, through a jacketed tube 4 past a temperature measuring element 5, and out of the measuring system at a point 6. The cooling medium which may, for example be water, is pumped from the reservoir 7 through a pump 8 through the jacket of tube 4 and returned to the reservoir 7. New cold water to maintain the circulating system at the necessary temperature to produce incipient gelation is introduced at a point 9 through a control valve 10, and hot water, if necessary, through a control valve 12.

Fig. 4 is similar to Fig. 1 with the exception that a jacketed section of the conduit 13 is located between the container of the material for which the gelation temperature is to be determined and the pump which passes it through the system.

The fluid passing through the tube or similar conduit 4 is cooled by the circulating medium to a point approaching the gel point, i.e., a point at which the viscosity of the fluid is extremely high. Since in the gelling region slight changes of temperature produce very large changes in viscosity and consequently in pressure, the temperature as measured by temperature element 5 will remain substantially constant over wide ranges of pressure. Under selected conditions, this temperature represents a reproducible value for a given fluid. The thermometer 11 may record or indicate the temperature of the circulating water. This temperature has also been found to be a function of the gel point, provided the temperature of the entering fluid is held constant. It, too, can therefore be used as a criterion of the gel point of the fluid undergoing test.

It is understood that the diagrammatic embodiment of the apparatus is intended to include any variations which will appear to those skilled in the art. For example, it may be desirable to have an additional temperature control of the fluid in the reservoir 1 or between the reservoir and the pump 2. It may be desirable to have an additional booster pump between the reservoir 1 and the pump 2, and it may be desirable under some circumstances to introduce strainers to remove foreign material which might clog the pump.

The temperature of the circulating water may be controlled through a submaster controller, which in turn is set by a pressure controller 3. For purposes of rapid response, it may be desirable to have supplies of both hot and cold water feeding the water circulating system, both variations being controlled by the same controller. If desired, the vessel may be equipped with an agitator and continuous flow of the fluid being measured may be maintained through it. In addition, a fluid which alters the gel point may also be introduced into the vessel 1, its rate of introduction being controlled by the temperature controller 5 to continuously and automatically produce a fluid of constant gel point leaving the container 1.

When the dope being measured forms an extremely viscous gel at the gel point, it may be necessary to warm the dope in the cooling zone to decrease the viscosity in order to pump the zone free for a subsequent cooling. The pressure at which the cooling zone is warmed is predetermined depending upon the characteristics of the dope being prepared in the continuous mixer.

Table 1 presents data indicating the relative change in pressure with respect to temperature of a typical liquid solution capable of gelling at a given temperature. Fig. 3 gives a typical pressure against temperature relationship and also indicates the stripping temperature as determined according to U.S. Patent 2,336,238. Fig. 2 gives a typical pressure-temperature gradient against temperature relationship. From these curves it can be seen that the pressure-temperature gradient increases sharply at the gelation temperature. In our preferred embodiment of this invention, we have found that the temperature at which the pressure temperature gradient is at least two times the gradient obtaining at temperatures sufficiently removed from the gelation temperatures to be uninfluenced by the gelling properties of the liquid is the critical value. This percentage pressure change per unit temperature change may be 2 to 10 times the gradient obtaining at the temperatures at which the solution is unaffected by its gelation properties. The data taken from Fig. 3 are shown in Table 1 and graphed in Fig. 2.

TABLE 1

*Typical pressure—Pressure gradient—Temperature relationships for gel point indicator*

| t° | (1) Pounds per square inch/ °F. | (2) Pounds per square inch | (3) Percent Pressure Change/ °F. |
| --- | --- | --- | --- |
| 96 | .50 | 8 | 6.3 |
| 90 | .70 | 11.5 | 6.1 |
| 85 | 1.00 | 15.8 | 6.3 |
| 80 | 2.35 | 23.0 | 10.2 |
| 78 | 4.35 | 30.0 | 14.5 |
| 77 | 9.4 | 37 | 25.4 |
| 76 | 19.2 | 51 | 37.6 |
| 75.5 | 29.0 | 63 | 46.0 |
| 75.2 | 75 | 80 | 94 |

(1) Slope of curve, Figure 3, pressure change per degree Fahrenheit.
(2) Pressure corresponding to given temperature from Figure 3.
(3) (1)/(2)×100, percent pressure change per degree Fahrenheit.

The temperature may be determined in any suitable manner such as with a copper constantan thermocouple and a L. N. Northrup Type K potentiometer. However, thermometers may also be used or other temperature measuring elements. The pressure may be measured by usual controls either through an air pressure system or electrically so that the cooling means is responsive to the pressure change.

Two sections of the conduit through which the material to be measured is passed may be jacketed in order to facilitate operation of the apparatus with certain solutions. For instance, one jacketed section may be located between the container or source of the material to be measured and the pump which pumps it through the system, while the second may be located between the pressure element and the thermometer which measures the temperature at which the material gels.

By means of the apparatus above described, the gel points of various cellulose derivative solutions or lacquers may be continuous, rapidly and automatically determined. Modifications of the apparatus may be made to use it in connection with various equipment found in ordinary chemical engineering practice so that the dope manufacturing equipment may operate continuously. By means of this equipment, the solutions may be adjusted to provide a definite and ascertainable gel point through the period of operation.

We claim:

1. An apparatus for continuously determining the gelpoint temperature of solutions which undergo gelation upon cooling, comprising in combination a conduit, means for forcing a gelable solution through said conduit, a pressure-responsive element for measuring a predetermined abrupt change in the pressure of said solution in said conduit, means for cooling the solution in said conduit to the gel point, means cooperating with said pressure-responsive element for raising the temperature of the said cooling means at a predetermined pressure and for lowering the temperature thereof at a different predetermined pressure, and a temperature measuring device for measuring the temperature at which gelation occurs in said conduit having its sensing element located in the said conduit.

2. An apparatus for continuously determining the gelpoint temperature of solutions which undergo gelation upon cooling, comprising in combination a tube, a pump for forcing a gelable solution through said tube, a pressure-sensitive control for responding to a predetermined abrupt change in the pressure of said solution in said tube, a jacketed section of said tube for cooling the solution to the gel point, by passing a liquid coolant through said jacketed section in a heat exchange relationship with the solution in said tube, means cooperating with said pressure-sensitive control for raising the temperature of the said liquid coolant at a predetermined pressure and for lowering the temperature thereof at a different predetermined pressure, and a temperature-measuring device adapted to measure the temperature at which gelation occurs in said tube having its sensing element located in said tube.

3. An apparatus for continuously determining the gelpoint temperature of solutions which undergo gelation upon cooling, comprising in combination conduit means, means for forcing a gelable solution through said conduit means from a continuous mixer, a pressure-responsive element for measuring a predetermined abrupt change in the pressure of said solution in said conduit means, means for cooling the solution in said conduit means to the gel point by passing a liquid coolant through a jacketed section of said conduit means, means cooperating with said pressure-responsive element for raising the temperature of the said cooling means at a predetermined pressure and for lowering the temperature thereof at a different predetermined pressure, a temperature-responsive device for measuring the temperature at which gelation occurs in said conduit having its sensing element located in said conduit.

4. A method of continuously determining the gelation temperature of a liquid solution capable of gelling at a given temperature which comprises continuously pumping the solution through a cooling zone, and cooling the solution until gelation of the solution occurs as indicated by a predetermined abrupt increase in viscosity and correspondingly predetermined pressure of said pumped solution and measuring the temperature in the cooling zone.

5. A method of continuously determining the gelation temperature of a liquid solution capable of gelling at a given temperature, comprising continuously pumping said solution through a cooling zone, cooling the solution until the rate of pressure change per unit temperature change is equal to a predetermined rate of pressure change and measuring the gelation temperature of the solution emerging from the cooling zone.

References Cited in the file of this patent

UNITED STATES PATENTS

| | | |
|---|---|---|
| 1,654,614 | Smith | Jan. 3, 1928 |
| 2,297,641 | Webber | Sept. 29, 1942 |
| 2,322,814 | Binckley | June 29, 1943 |
| 2,591,084 | Martin | Apr. 1, 1952 |
| 2,635,455 | Staehlng | Apr. 21, 1953 |
| 2,635,457 | Dickey | Apr. 23, 1953 |
| 2,671,335 | Bussey | Mar. 9, 1954 |
| 2,750,433 | Le Tourneau et al. | June 12, 1956 |